(12) United States Patent
Soliven et al.

(10) Patent No.: US 12,344,141 B2
(45) Date of Patent: Jul. 1, 2025

(54) VEHICLE SEAT AND A METHOD FOR PRODUCING THE VEHICLE SEAT

(71) Applicant: Adient US LLC, Plymouth, MI (US)

(72) Inventors: Reinier Soliven, Rochester, MI (US); John Gomez, Howell, MI (US); Thomas Gould, Howell, MI (US); John Beranek, Ann Arbor, MI (US); Ruben Eugenio Acosta Macias, Juarez (MX); Annette Holbrook, Northville, MI (US); Niels Mondelaers, Laakdal (BE); Marc Poulin, Chesterfield, MI (US); Raza Bashir, Sterling Heights, MI (US)

(73) Assignee: Adient US LLC, Plymouth, MI (US)

( * ) Notice: Subject to any disclaimer, the term of this patent is extended or adjusted under 35 U.S.C. 154(b) by 0 days.

(21) Appl. No.: 18/835,385

(22) PCT Filed: Feb. 10, 2023

(86) PCT No.: PCT/US2023/062338
§ 371 (c)(1),
(2) Date: Aug. 2, 2024

(87) PCT Pub. No.: WO2023/154834
PCT Pub. Date: Aug. 17, 2023

(65) Prior Publication Data
US 2025/0135972 A1 May 1, 2025

Related U.S. Application Data

(60) Provisional application No. 63/267,851, filed on Feb. 11, 2022.

(51) Int. Cl.
*B60N 2/58* (2006.01)
(52) U.S. Cl.
CPC ......... *B60N 2/5891* (2013.01); *B60N 2/5866* (2013.01)
(58) Field of Classification Search
CPC .................. B60N 2/5891; B60N 2/5866
See application file for complete search history.

(56) References Cited

U.S. PATENT DOCUMENTS

2017/0240083 A1* 8/2017 Schulze ............... B60N 2/5891

FOREIGN PATENT DOCUMENTS

| JP | 3881578 B2 | * | 2/2007 | |
| JP | 4274808 B2 | * | 6/2009 | ......... B29C 33/3814 |
| KR | 20170122396 A | * | 11/2017 | |
| KR | 20180104552 A | * | 9/2018 | |

(Continued)

OTHER PUBLICATIONS

Hwang Yong Jun; KR20200058755A; Seat cover and manufacturing method of the same; EPO English Machine Translation; May 28, 2020; pp. 1-6 (Year: 2020).*

(Continued)

*Primary Examiner* — Bayan Salone
(74) *Attorney, Agent, or Firm* — Marshall & Melhorn, LLC

(57) ABSTRACT

A method of forming a seat cover may include providing a high frequency welding device, locating a seat cover in the high frequency welding device, and energizing the high frequency welding device to either join two or more pieces of the seat cover together or to impart a shape to form a contoured seat cover.

20 Claims, 13 Drawing Sheets

(56) References Cited

FOREIGN PATENT DOCUMENTS

| KR | 20200058755 A | * | 5/2020 | |
|---|---|---|---|---|
| WO | WO-2021153998 A1 | * | 8/2021 | ........... B29C 59/022 |

OTHER PUBLICATIONS

Youn Ta Chell; WO-2021153998-A1; Method for Manufacturing Vehicle Seat Cover; Epo English Machine Translation; Aug. 5, 2021; pp. 1-6 (Year: 2021).*
JP-3881578-B2; Suematsu et al.; Apparatus and Method for Manufacturing Seat for Vehicle; English Machine Translation; pp. 1-12; Feb. 14, 2007 (Year: 2007).*
European Patent Office, International Search Report and Written Opinion in Application No. PCT/ US2023/062338, dated May 23, 2023, 9 pages, Rinswijk, Netherlands.

* cited by examiner

VEHICLE SEAT AND A METHOD FOR PRODUCING THE VEHICLE SEAT

BACKGROUND

Consumers are demanding attractive and comfortable vehicle seating that departs from the previous seat designs, which are viewed negatively in terms of comfort, appearance and materials. By way of example, some previous seating was made by cutting out materials and then sewing and/or gluing them together. This limits options for materials that can be used, how the materials can be combined, the features that can be associated with the materials, the manufacturing processes for them and their appearance. Seat manufacturers must develop and produce new, comfortable and attractive seating in the most cost and time efficient manner possible to respond to consumer demand.

Disclosed herein are various manufacturing methods and resulting seats and seat components that provide a large degree of flexibility to use and combine various materials to develop the seats and seat components that are aligned with current consumer demands and manufacturing efficiencies.

SUMMARY

A method of forming a seat cover may comprise providing a high frequency welding device, locating a seat cover in the high frequency welding device and energizing the high frequency welding device to either join two or more pieces of the seat cover together or to impart a shape to the seat cover.

In another aspect, at least one mold part of the high frequency welding device closes at least partially about the seat cover so that heat from the mold part and the shape of the mold part transfers to the seat cover.

In another aspect, the at least one mold part imparts at least one of a pattern, a contour, a projection, a texture, a groove, a trench, a concave shape, or a convex shape to the seat cover.

In another aspect, the two pieces of the seat cover that are joined together are a trim layer, a foam layer or a carrier layer of the seat cover.

In another aspect, the two pieces of the seat cover that are joined together are two adjacent pieces of a trim layer.

In another aspect, the seat cover is joined to a cushion and the seat cover and the cushion are located in the high frequency welding device and the seat cover and the cushion are simultaneously shaped and joined.

In another aspect, the high frequency welding device joins two or more pieces of the seat cover together the pieces have different melt rates.

In another aspect, the high frequency welding device joins two or more pieces of the seat cover together the pieces have different thicknesses.

Another aspect may comprise attaching a trim tie down to the seat cover with high frequency welding.

DETAILED DESCRIPTION OF THE PREFERRED EMBODIMENTS

It is to be understood that the device and process may assume various alternative orientations and step sequences, except where expressly specified to the contrary. It is also to be understood that the specific devices and processes illustrated in the attached drawings, and described in the following specification are simply exemplary embodiments of the concepts herein. Hence, specific dimensions, directions or other physical characteristics relating to the embodiments disclosed are not to be considered as limiting, unless expressly stated otherwise.

Figure 1:
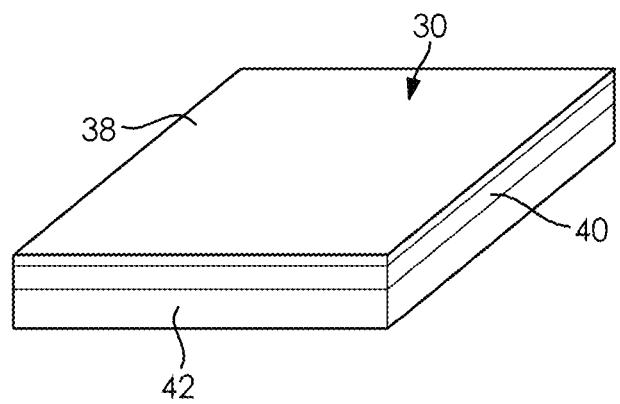
FIG. 1 is schematic perspective view of a portion of one embodiment of a seat cover.
Figure 6:
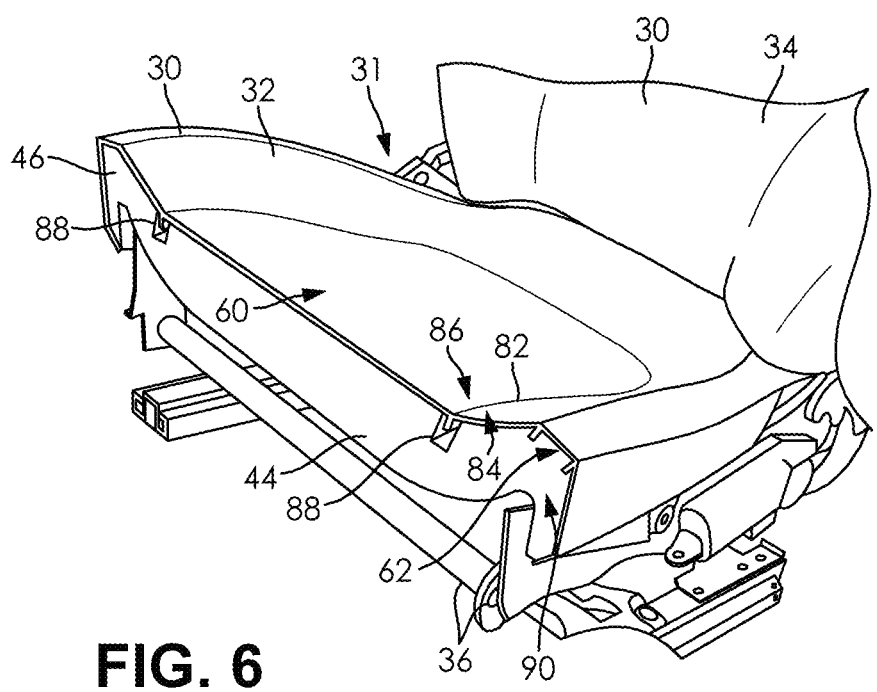
FIG. 6 is a schematic partial cross-section view of a seat.

Turning now to FIG. 1, one embodiment of a portion of a seat cover 30 for a seat 31 is depicted. The seat cover 30 may be shaped, sized and adapted to extend over at least part of seating components such as a seat cushion 32 and/or a seat back 34 and/or frame members 36 for the seating components, one embodiment of which is depicted in FIG. 6. The seat cover 30 may fully or partially encase/enclose the seating components 32, 34 and/or the frame 36. The seat cover 30 may provide a comfortable, direct contact surface for the occupant and also provide aesthetic details and finishes to the seat components 32, 34.

The seat cover 30 may be comprised in whole or in part by a trim layer 38. The trim layer 38 may be constructed of a textile, or textile-like structure. Natural materials, such as leather, and man-made materials, such as vinyl, may be used in whole or part of the trim layer 38 as well. The trim layer 38 may be one piece or it may be comprised of two or more pieces. Further, the trim layer 38 may be continuous or non-continuous.

In one embodiment, the trim layer 38 is a vinyl material, in particular a laminated or non-laminated vinyl material, for example a polyvinylchloride (in short referred to as PVC). Alternatively, the trim layer 38 can be a laminated or non-laminated textile material, in particular a woven fabric, or a laminated or non-laminated natural material, such as leather. The trim layer 38 is optionally pre-treated and available as a substantially endless material, for example, which is cut to size for the production of the seat cover 30. A trim layer blank that results therefrom has a blank shape that is adapted to the desired final shape. The trim layer 38 can be reinforced and/or coated. It can also be configured so as to be smooth or porous. The trim layer 38 may be thin in comparison to a foam layer 40 and/or carrier layer 42, where these layers 40, 42 may have greater thickness.

The trim layer 38 may extend substantially over a foam layer 40. The foam layer 40 may be such as a latex type foam or a polyurethane foam. The foam layer 40 may be located directly below the trim layer 38 or there may be intervening layers. Further, the foam layer 40 may be continuous or noncontinuous. The foam layer 40 may have a constant thickness or the thickness may vary.

The foam layer 40 may extend substantially over the carrier layer 42. The carrier layer 42 may be such as a woven material constructed of natural or manmade materials. The carrier layer 42 may be located directly below the foam layer 40 or there may be intervening layers. Further, the carrier layer 42 may be continuous or noncontinuous. The carrier layer 42 may have a constant thickness or the thickness may vary.

The carrier layer 42 may be a non-woven material such as a press felt or a carpet or a warp or weft knitted fabric, for example from plastics fibers and/or natural fibers and/or reinforcement fibers. The fibrous material may be pre-shaped and optionally be pre-treated. The fibrous material may be available as a substantially endless material, for example, which is cut to size for the production of other seat components. The fibrous material can be formed from one or more different materials, for example from polyester, polyethylene, polypropylene and/or polyurethane. The fibrous material can be formed from randomly oriented fibers, such as recycled or virgin natural and/or plastics fibers. The non-woven material can be formed from a three-dimensional stochastically oriented fibrous material. Alternatively, the fibrous material can be a woven or a non-woven fabric. The fibrous material can optionally be thermally pre-treated. Plastics fibers are formed from a thermoplastic material such as from a modified and weldable thermoplastic material. For example, the plastics fibers are formed from polyethylene terephthalate (PET), from polyester, or from a synthetic polymer, such as from polylactic acid (PLA). A mixture of fibers from various plastics is also possible.

As noted above, the seat cover 30 may be connected to the seat components 30, 32 one embodiment of which is schematically depicted in FIG. 6. Both the seat cushion 32 and the seat back 34 may have frame members 36 that provide a rigid internal structure that may be directly or indirectly attached to the vehicle. The frame members 36 may be connected together and they may be moveable relative to one another and/or the vehicle. Typically, padding material 44 which may be comprised of foam or non-woven materials, such as of the type mentioned above, may be located between the frame members 36 and the seat cover 30 to provide shape and comfort to the seat 31. The discussion below will focus on the seat cushion 32, but it can be readily appreciated that the seat back 34 can be similarly created. The combined seat cover 30 and seat cushion 32 is referred to below as a lower seating surface 46.

The lower seating surface 46, which may also include frame members 36 and padding materials 44, having at least the trim layer 38 and none, one or all of the foam and carrier layers 40, 42, may be provided with designs, textures, shapes and/or features via a high frequency welding or molding step. A description and figures of one embodiment of a device and steps for high frequency welding such parts follows.

Figure 2:
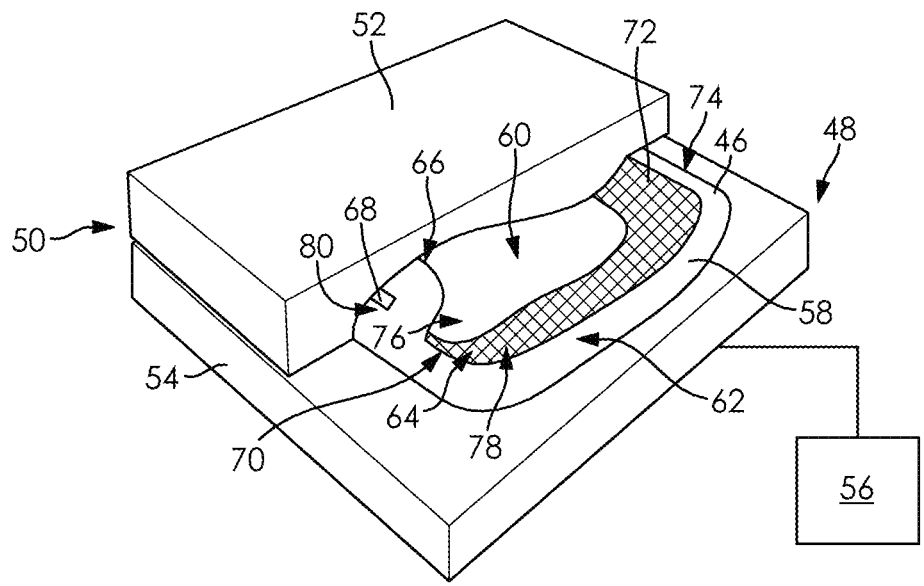
FIG. 2 is a schematic perspective view of one embodiment of a lower seating surface in partial upper and lower mold parts.

One device for producing the lower seating surface 46 may comprise a forming and joining unit 48. One embodiment of such a device is schematically depicted in FIG. 2. The forming unit may be a forming press 50 having an upper mold part 52 and a lower mold part 54. The joining unit 56 may be a generator. The joining unit 56 has, for example, a high-frequency generator which generates an electromagnetic field. For a combined press-forming and press joining method, the generator is moreover coupled to the press 50. In either case, the press 50 can be configured as an electric, hydraulic, or pneumatic press.

In the case of an electric press, the generator generates an electromagnetic field between two electrodes, for example having a high frequency in a range of more than 20 MHZ, in particular of 25 MHZ or 27 MHZ. Heat, also referred to as welding heat, is generated by molecular oscillations (friction heat) directly in the materials to be joined, such as welded or molded.

While welding and joining are mentioned above, the same process may be used to shaped or mold materials. The same heat that is created by the generator can be used to shape the same materials mentioned herein to provide various sizes, shapes and/or features for the lower seating surface 46. In most cases, the process and machinery for high frequency welding are mentioned, however, it should be understood that high frequency molding may be substituted in each of these instances.

Either the upper mold part 52 or the lower mold part 54 may have positive and negative shapes such as contours, grooves, projections, textures or other features. The shapes correspond to textures, shapes and/or features desired for the lower seating surface 46. High frequency welding may be used to join the seat cover 30 and underlying padding materials 44, parts or sections associated with each, as well as provide the above-mentioned features.

With continued reference to FIG. 2, one example of a lower seat surface 46 disposed between an upper mold part 52 and a lower mold part 54 is schematically depicted. High frequency welding may be used to shape the lower seat surface 46 to have an upper surface 58 that may have a generally concave shape. For example, the generally concave upper surface 58 may be formed by compressing and/or reducing the seat cover 30 and/or padding materials 44 in a central area 60 of the lower seat surface 46 while providing at least a perimeter portion 62 of the lower seat surface 46 that extends above the central portion 60. The perimeter portion 62 may be used to at least partially form side bolsters in the lower seating surface 46.

The same process may be used to form in other features of the lower seat surface 46. Another example of such a feature comprise leg concavities 64 that bound a central rise 66 in the upper surface 58. The concavities 64 and central rise 66 may function to cradle an occupant's legs in at least a partially contoured manner.

High frequency welding may also be used to create other textures, shapes and/or features in the lower seat surface 46. Such textures, shapes and/or features may be located in all, or selective portions of the seat cover 50 and/or padding materials 44. The textures, shaped and/or features may be tooled into the upper and/or lower mold parts 52, 54 to so as to locate them in the desired area of the lower seating surface 46. In the example depicted in FIGS. 2, a logo 68, a trench feature 70 and a texture 72 are located in the upper surface 58 of the lower seating surface 46.

FIG. 2 shows one example of a texture 72 where at least a portion of the perimeter portion 62 of the upper surface 58 of the lower seating surface 46 may have a diamond type pattern formed thereon. The exemplary embodiment shows that the texture 72 is distinct along a rear portion 74 of the lower seating surface 46, but it becomes less distinct, or fades, into a smooth surface 76 such as along a side bolster portion 78. While a diamond type pattern is shown, other patterns and/or shapes may be used that fade or do not fade. In this particular example, the central area 60 or the upper surface 58 may be generally smooth, or without a pattern.

The logo 68 may be formed in the seat cover 30 by high frequency welding. In the depicted embodiment, the logo 68 is located in a forward portion 80 of the seat cover 30, but it may be located in other portions as well. The high frequency welding process may result in the logo 68 being recessed, or embossed, in whole or in part, into the seat cover 30.

As noted above, another feature that may be located into the seat cover 30 may be such as the trench 70. In this embodiment, the trench 70 may be such as a substantially continuous channel of substantially constant depth that extends about the perimeter portion 62 of the seat cover 30. While one shape, size, depth and location of the trench 70 is depicted, variations may be permissible.

Figure 3:
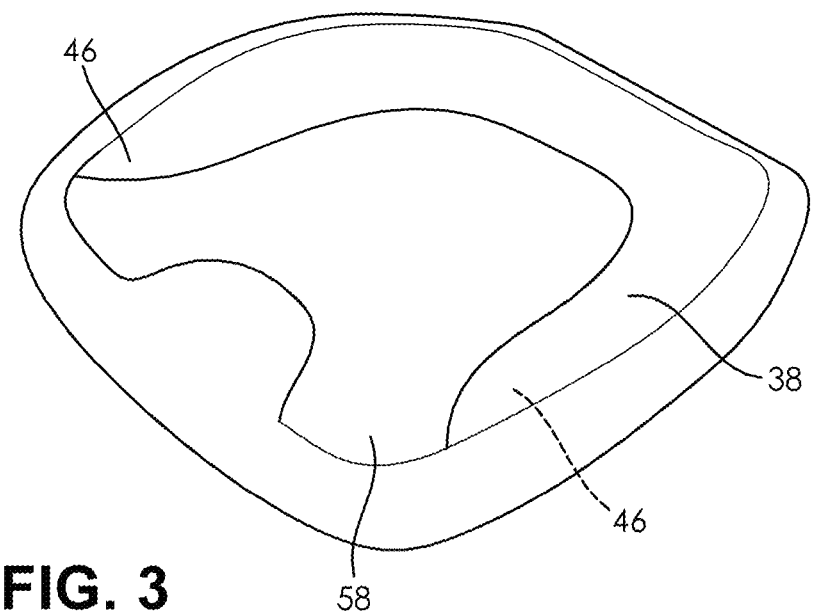
FIG. 3 is a schematic perspective view of a lower seating surface.

Turning now to FIG. 3, another embodiment of a lower seating surface 46 is schematically depicted. The lower seating surface 46 may be comprised of two or more trim layer 38 materials. The trim layer 38 materials may be the same as one another or they may be different. For example, the trim layer 38 materials may differ from one other in terms of size, shape, thickness and/or type. The trim layer 38 materials may be joined in whole or in part to one another prior to high frequency welding, such as by sewing or gluing, or during high frequency welding. In either case, the trim layer 38 materials may abut one another and/or overlap one another so that they may be joined.

The trim layer 38 materials of the lower seat surface 46 of FIG. 3 may be located in the high frequency forming and joining unit 48 described above to be connected together. From FIG. 3, it may also be appreciated that the trim layer 38 materials may be located on padding materials 44 and both can be located in the high frequency forming and joining unit 48 so that the trim layer 38 materials, in whole or in part, can be joined together and/or to the padding materials 44.

In addition to joining the trim layer and/or the padding materials 38, 44, the forming and joining unit 48 may also simultaneously shape the trim layer 38 materials and the padding materials 44 so that they both have a complementary shape to the unit 48. Of course, the trim materials may obtain the same shape as the padding materials 44.

Figure 4:
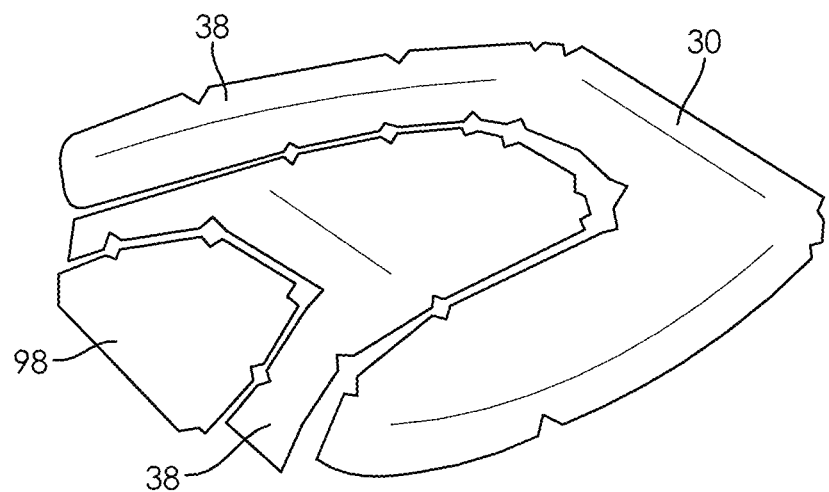
FIG. 4 is a schematic perspective view of trim for a seat cover.
Figure 5:
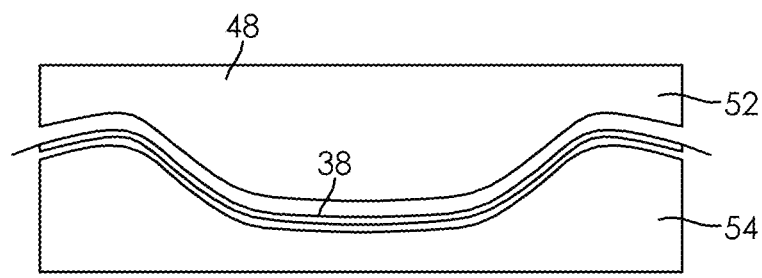
FIG. 5 is a schematic cross section view of a seat cover in upper and lower mold parts.

FIGS. 4 and 5 depict the embodiment where two or more trim layer 38 materials may be used to create a seat cover 30. FIG. 4 shows one embodiment of the individual trim materials that might be used to create a seat cover 30. The materials may be at least partially stitched before or after they are located in a high frequency welding unit 48. FIG. 5 shows the trim layer 38 materials in a high frequency welding unit 48 adapted to join the trim layer 38 materials.

FIG. 6 depicts one embodiment where a perimeter portion 62 of a lower seating surface 46, has been high frequency welded to a central area 60. The weld may be located at an intersection 82 of the perimeter portion 62 and the central area 60. The weld may extend substantially continuously about the intersection 82. The intersection 82 may be such as where an edge portion 84 of the perimeter portion 62 and an edge portion 86 of the central area 60 are joined resulting in a seam. The seam may be extend downwardly from the upper surface 58 of the trim layer 38 material. The seam may be located in a groove 88 located in the padding materials 44.

The perimeter portion 62, which may just be the seat cover 30, that may have been shaped via high frequency welding to have a complementary shape to raised portions 90 in the padding materials 44, such as at the bolster areas. The perimeter portion 62 may then be located over the raised portions 90 and then the perimeter portion 62 may be sewn or glued to the inner central area 60 or joined as noted above.

Figure 7:
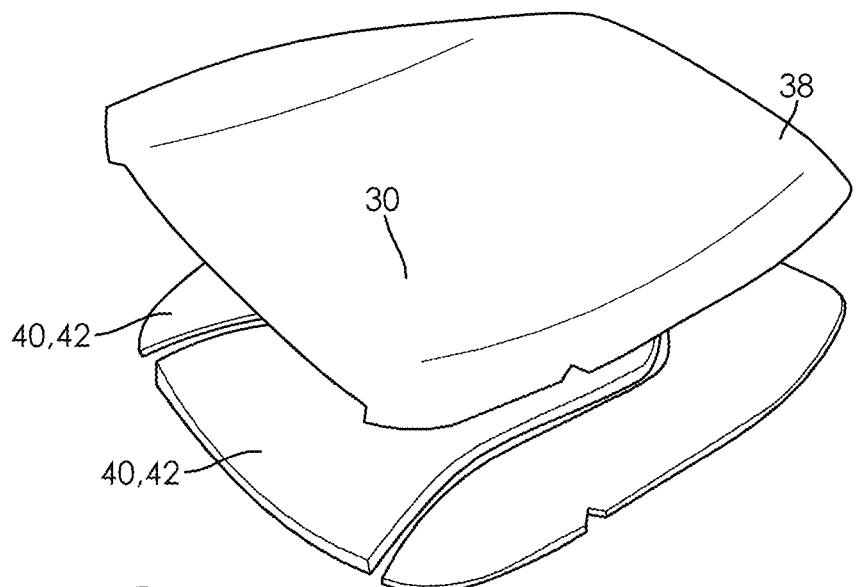
FIG. 7 is a schematic perspective view another embodiment of seat cover.
Figure 8:
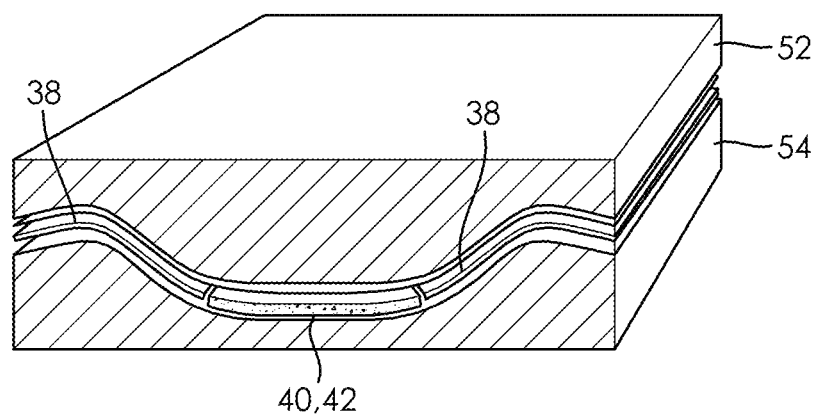
FIG. 8 is a schematic partial cross-section of the molded seat cover of FIG. 7 in upper and lower mold parts.

FIGS. 7 and 8 depict another embodiment where the composition and/or thickness of seat cover 30 may be varied. The variation results in different aesthetics, padding and feel thus effectively tuning the seat cover 30 for the occupant. For example, by locating different materials with different melt rates into the high frequency forming and joining unit 48, when the unit 48 is energized, the materials respond, such as soften, in different amounts and/or at different rates resulting in a seat cover 30 with different softness or cushioning in different areas.

From FIGS. 7 and 8 it can also be appreciated that the seat cover 30 can be joined to the carrier layer 42 or the foam layer 40. In one embodiment, the seat cover 30 may be thinner than the carrier layer 42. And, the carrier layer 42 may be constructed of two different thicknesses or types of material. The seat cover 30 may be located at least partially above the carrier layer 42 and the seat cover 30 and carrier layer 42 may be located in a high frequency welding forming and joining unit 48 as shown in FIG. 8. The unit 48 may weld and/or form the seat cover 30 and the carrier layer 42 together in whole or part. By joining two such parts together the firmness/softness of various portions of the lower seating surface 46 may be controlled. In one such example, the perimeter portion 62 may have a carrier layer 42 that is not as thick as a carrier layer 42 in the center area 60 thus providing the perimeter portion 62 with a firmer feel and greater support.

Figure 9:
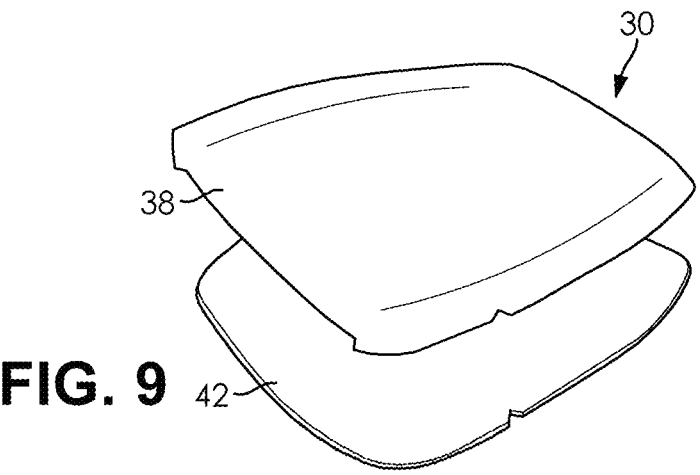
FIG. 9 is a schematic perspective view of another embodiment of a seat cover.
Figure 10:
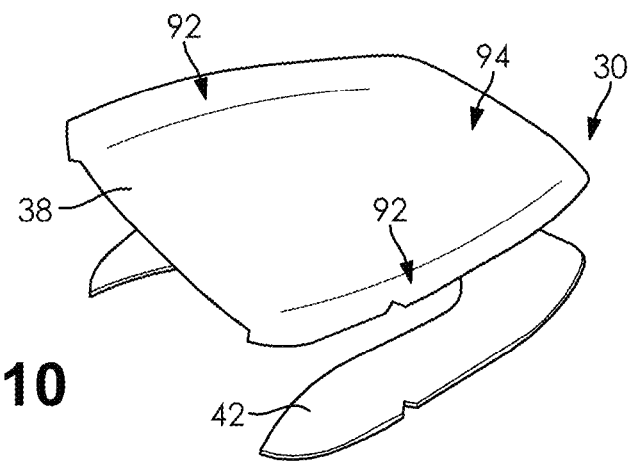
FIG. 10 is a schematic perspective view of another embodiment of a seat cover.
Figure 11:
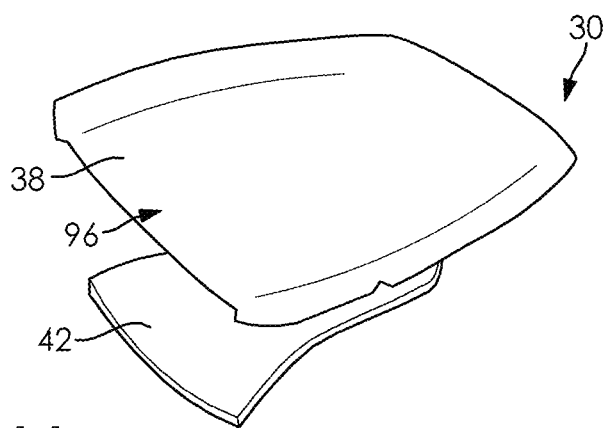
FIG. 11 is a schematic perspective view another embodiment of a seat cover.

FIGS. 9, 10 and 11 depict alternative embodiments to the concepts in FIGS. 7 and 8. The alternative embodiments demonstrate how the carrier layer 42 shape and coverage may vary to adjust the shape and/or softness of the seat cover 30 for various applications and/or to customize the seat cover 30 to the preferences of a particular occupant.

For example, in FIG. 9, the carrier layer 42 may extend substantially the length and width of the trim layer 38 so as to have a general full complementary size and shape as the trim layer 38. FIG. 10 shows a variation where the carrier layer 42 may only extend along the side portion 92 of the trim layer 38 and a rear portion 94 of the trim layer 38; a center portion 96 of the carrier layer 42 may be open. FIG.

11 depicts the situation where the carrier is sized and shaped to be complementary to the center portion 96 of the trim layer 38. In this case, the carrier layer 42 terminates before substantially extending into the side portion 92 or the center portion 96 of the trim layer 38.

Figure 12:
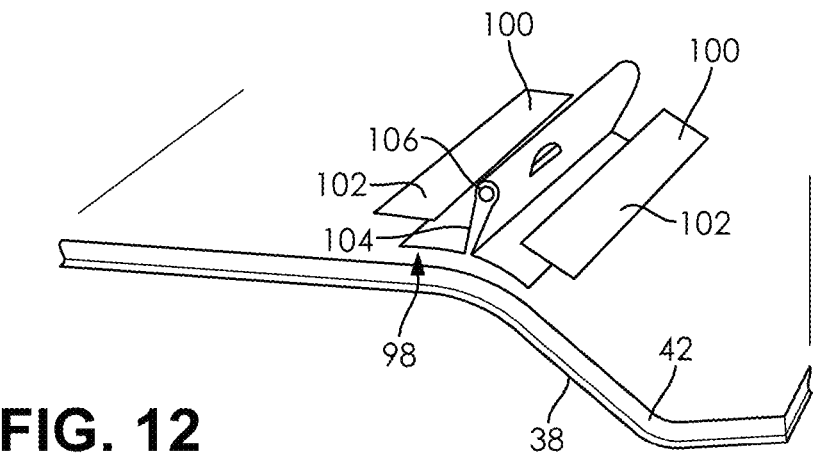
FIG. 12 is a schematic perspective view of one embodiment of an underside of a seat cover with a trim attachment feature.
Figure 13:
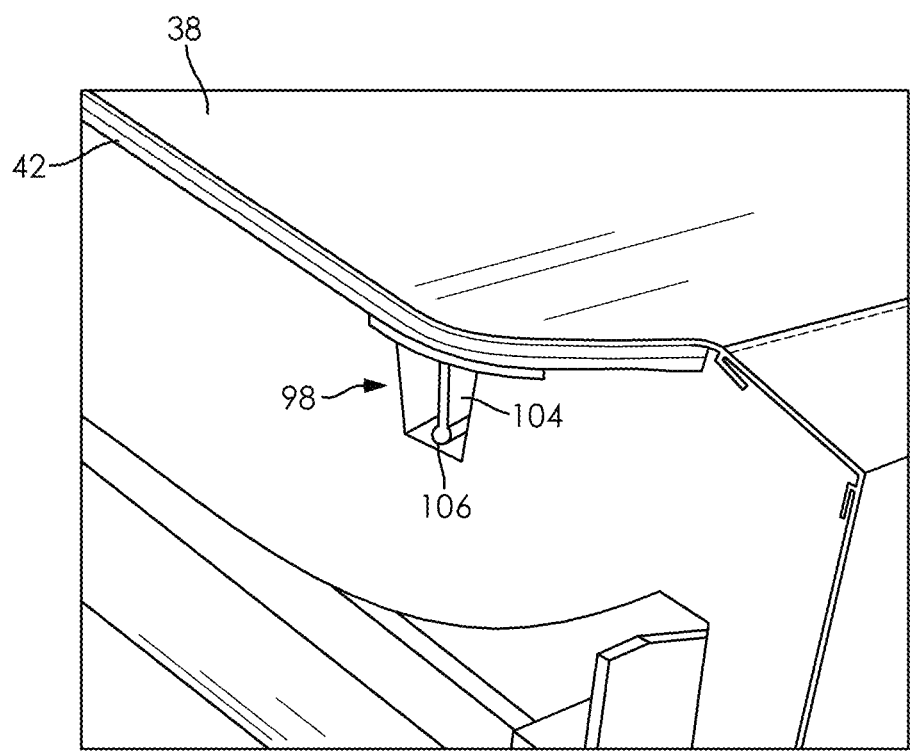
FIG. 13 is a schematic, partial cut away view of a lower seating surface with the seat cover of FIG. 12.

Referring back to FIG. 6 and also now FIGS. 12 and 13, one embodiment, where a tie down 98, which may be a beaded duon, may be connected, such as directly attached, to the trim layer 38 or the carrier layer 42 is depicted. The tie down 98 may be connected to the trim layer 38 or the carrier layer 42 before, during or after the high frequency welding process. If the tie down 98 is connected to the trim layer 38 or carrier layer 42 before or after the high frequency welding process it may be done with an adhesive tape 100, as shown in FIG. 12. The tie down 98 may also be secured to the trim layer 38 or the carrier layer 42 through the high frequency welding process. In such a case, a groove may be provided in one of the mold parts e.g., 52 or 54 to accommodate the tie down 98. Surface engaging tabs 102 of the tie down 98 may be connected to the trim layer 38 or the carrier layer 42 via the high frequency welding process so that they extend substantially along at least a portion of the trim layer 38 or carrier layer 42 so they are secured thereto. A body portion 104 of the tie down 98 may extend from the surface engaging tabs 102. The body portion 104 may capture a wire or tube 106 in a portion remote from the surface engaging tabs 102 which may give the body portion 104 a teardrop shape.

Figure 14:
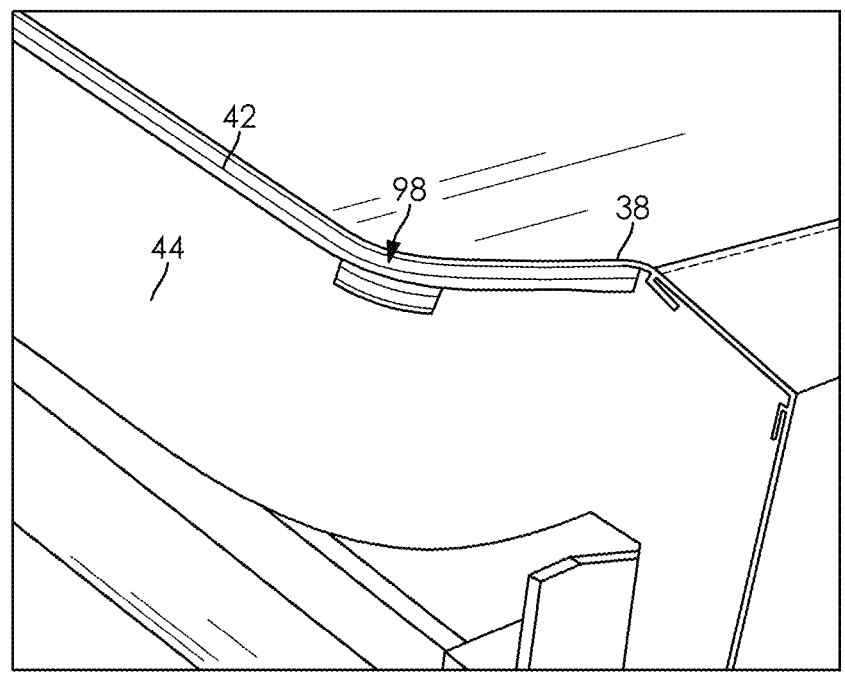
FIG. 14 is a schematic, partial cut away view of a lower seating surface with a seat cover.

A related embodiment is depicted in FIG. 14. In this embodiment, the tie down 98 may be such as a hook and loop fastener. The hook portion or the loop portion may be located in one of the mold parts 52, 54, while the opposite portion may be located on the seat cover 30 or carrier layer 42. More particularly, the portion located on the mold part 52, 54 may be connected to padding materials 44, which may also be in the mold part 52, 54. When the padding materials 44 are removed from the mold part 52, 54, the seat cover 30 and/or carrier layer 42 may be connected to the padding materials 44 via the hook and loop fastener tie down 98.

Figure 15:
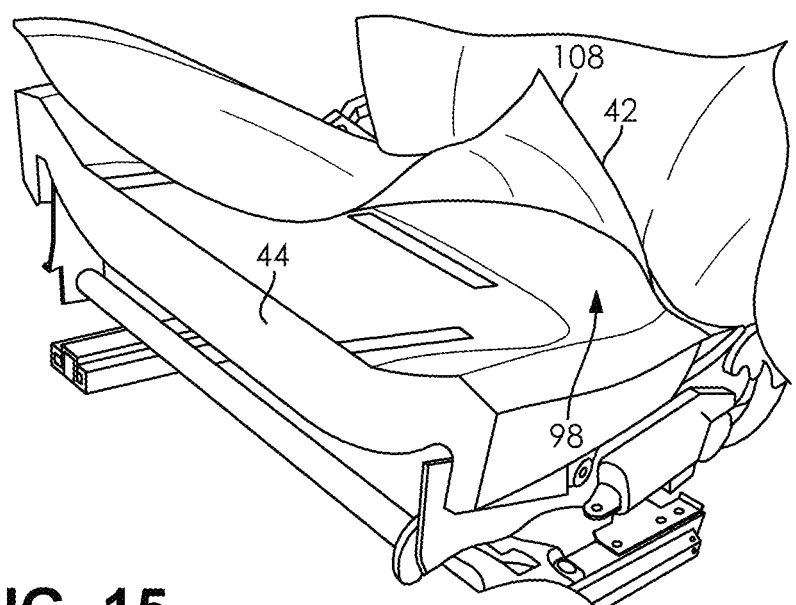
FIG. 15 is a schematic, partial cut away view of a lower seating surface with a seat cover.

FIG. 15 depicts a related embodiment wherein either the hook part or the loop part of a hook and loop fastener tie down 98 may be connected to the carrier layer 42. The figure depicts one of the hook and loop fastener tie downs 98 as extending substantially across a bottom surface 108 of the carrier layer 42, but other sizes and shapes may be used.

The connection between the tie down 98 and the carrier layer 42 may be such as a high frequency weld which may be accomplished and appreciated through the foregoing description and figures. Alternatively, one part of the tie may be attached to the trim layer 38 via adhesive or stitching or the like.

The complementary part of the tie down 98 may be secured to the padding materials 44, as shown in the figure. Here also, while strips of the complementary part are shown in certain areas of the padding materials 44 other sizes, shapes and complementary parts may be located thereon.

Figure 16:
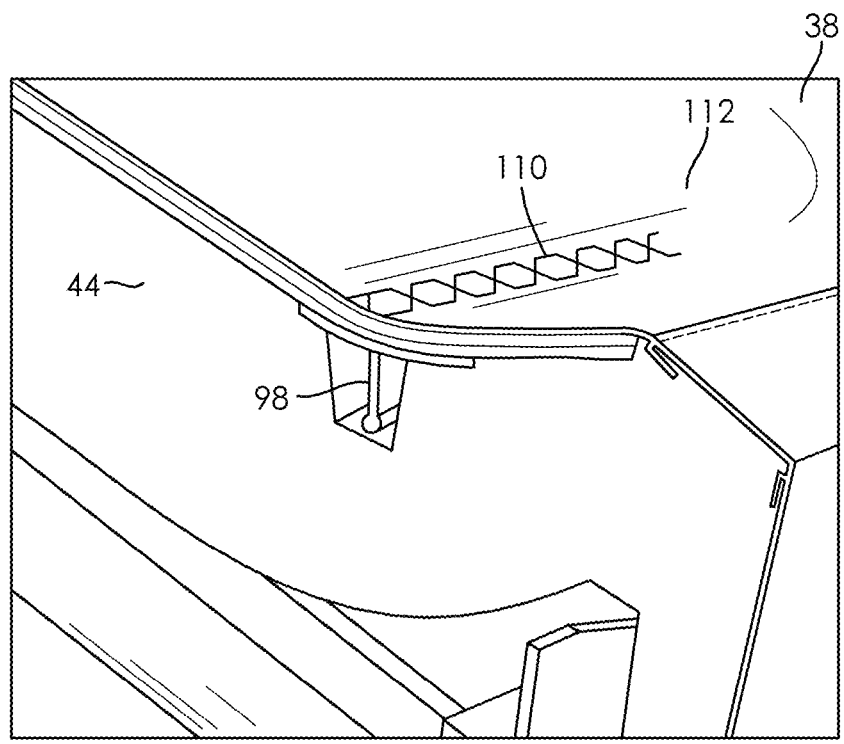
FIG. 16 is a schematic, partial cut away view of a lower seating surface with a seat cover.

FIG. 16 depicts an embodiment where a length of stitching 110 is located on an outer surface 112 of the trim layer 38. The figure depicts the stitching 110 having a particular size, shape and location, but variations may be permissible. In this instance, the length of stitching 110 happens to be aligned with a tie down 98. This may be advantageous as it may help camouflage the seam created by the tie down 98 if so desired. The stitching 110 may function to secure the trim layer 38 to the tie down 98 and thus the padding materials 44 and/or the stitching 110 may be decorative in nature.

Figure 17:
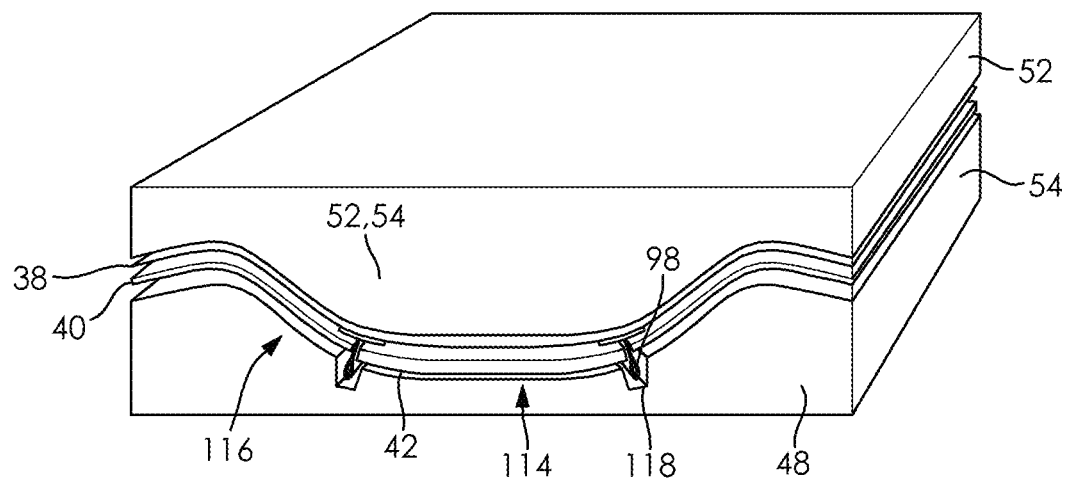
FIG. 17 is a schematic, partial cut away view of a seat cover between an upper mold part and a lower mold part.
Figure 18:
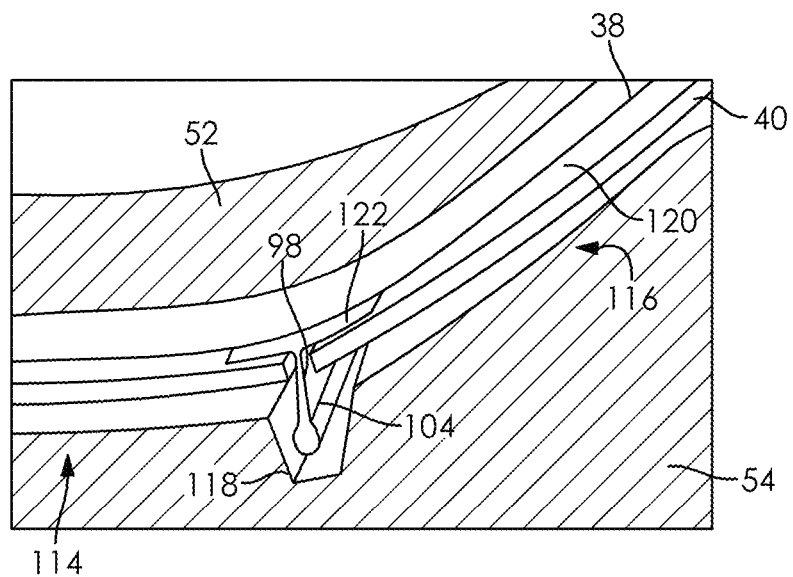
FIG. 18 is a detail from FIG. 17.

Turning to FIGS. 17 and 18 another embodiment of a device and method to attach a trim layer 38 to a foam layer 40 or a carrier layer 42 may be appreciated. In this embodiment the trim layer 38 is located in a high frequency forming and joining unit 48 having an upper mold part 52 and a lower mold part 54. The mold parts 52, 54 have a curvilinear shape to impart a complementary shape to the layers 38, 40 and/or 42. By way of example, the lower mold part 54 may define a central lower portion 114 bounded on the lateral sides by rising transition sections 116. The central lower portion 114 may be shaped to adapt the layers 38, 40 and/or 42 to receive and support a passenger's seat and lower thighs. The rising transition sections 116 may be shaped to adapt the layers 38, 40, and/or 42 into bolsters that extend along the sides of the passenger's thighs.

The foam and/or a carrier layers 40, 42 may also be located between the mold parts 52, 54. As schematically depicted in FIG. 17, the foam layer 40 may be located adjacent the central lower portion 114. The central lower portion 114 may be bounded by grooves, such as grooves 118 in the lower mold part 52. The grooves 118 are adapted to accommodate tie downs 98 in the part 52. The grooves 118 provide a space for the tie downs 98 so that they do not bleed or show through to the outer surface 112 of the trim layer 38 when attached thereto and to ensure the correct portion of the tie down 98 connects with a lower surface 120 of the trim layer 38.

As shown in both FIGS. 17 and 18, an upper surface 122 of the tie down 8, such as a beaded duon, may be positioned in direct facing contact with the lower surface 120 of the trim layer 38. High frequency welding may be used to attach the tie down 98 to the trim layer 38, the trim layer 38 to the foam layer 40 and/or the tie down 98 to the foam layer 40. The body portion 104 of the tie down 98 may extend through the foam layer 40 and/or carrier layer 42 and into the groove 118 in the lower mold part 54.

While attaching the tie down 98 via high frequency welding is mentioned, the tie down 98 may also be attached to the trim layer 38 via an adhesive or stitching before or after any high frequency welding step, such as to secure layers 38, 40, 42 or parts together, etc. However, it may be preferred to high frequency weld the tie down 98 as doing so eliminates a post welding step. Similar steps may be taken to use hook and loop fasteners or molded in plastic parts to connect the layers, or features thereof, together.

Figure 19:
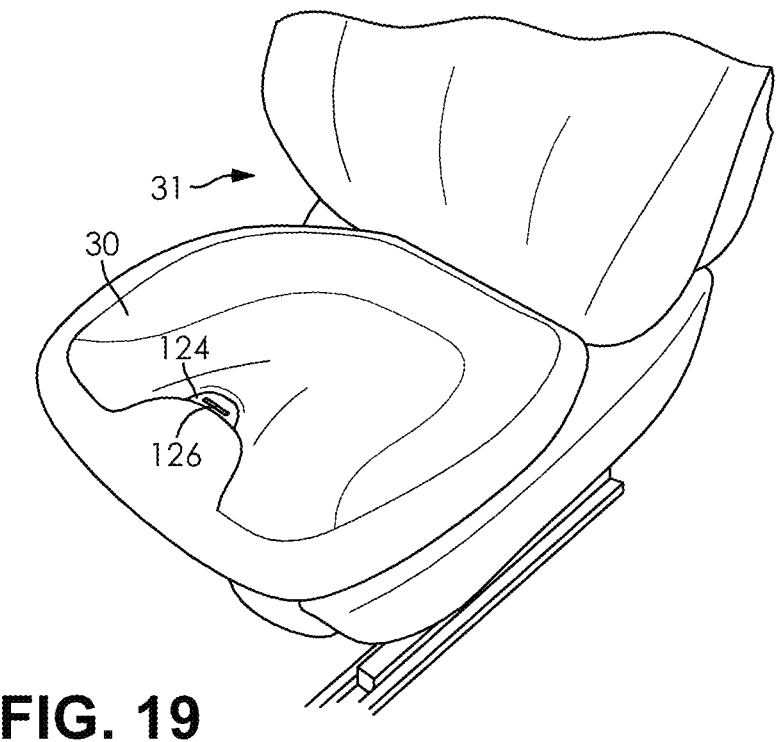
FIG. 19 is a schematic, perspective view of a seat.
Figure 20:
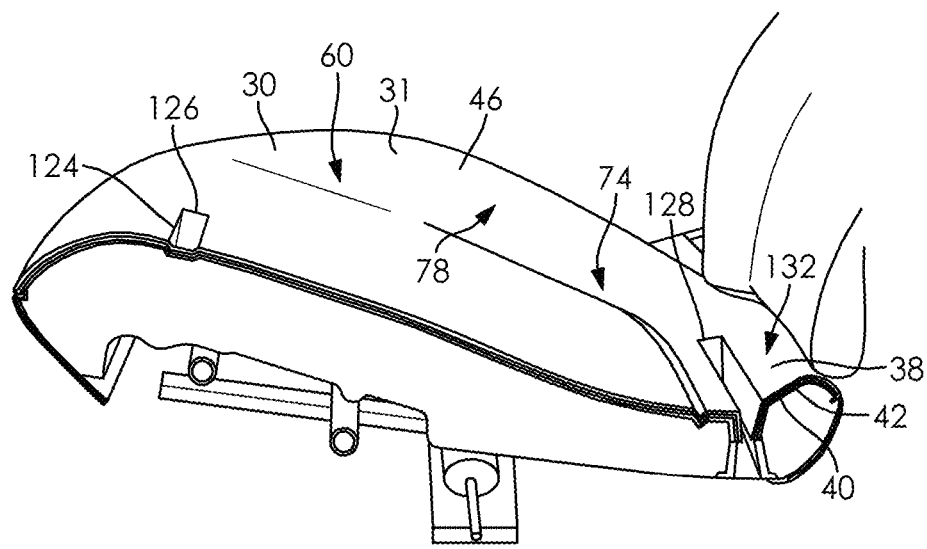
FIG. 20 is a partial, cut away side view of a lower seating surface.

As noted above, high frequency forming can be used to shape and mold various components of the seat 31. FIGS. 19 and 20 depict examples where a badge recess 124 may be formed in the layers 38, 40, and/or 42 such as by high frequency forming. In both examples, a badge recess 124 may be located in the forward portion 80 of the layers 38, 40, and/or 42. While one location for a badge recess 124 of one shape and size are depicted, other locations and different sizes and shapes may be used as well.

The badge recesses 124 may be formed in the trim layer 38 and/or the foam layer 40 and/or the carrier layer 42. The recesses 124 may be formed by having a similarly shaped feature extending from one of the mold parts 52, 54. The similarly shaped feature may be pressed into the layer 38, 40, and/or 42 and these layers 38, 40, and/or 42 may take on a complementary shape.

Further, a badge 126 may also be located in the mold part 52, 54, or it may be placed on the trim layer 58 to be molded when it is located into the mold 52, 54. The badge 126 may be secured into the badge recess 124 at the same time the badge recess 124 is formed via the high frequency molding/welding step. Securing the badge 126 into the recess 124 while the recess 124 is formed is a clear advantage over the previous multi-step process of creating the badge recess in a seat surface during formation of the seat, and then securing the badge therein in a separate step at a separate time.

Other seat features may also be created using high frequency forming. The feature may be such as one or more slots 128 or openings in the seat 31 for ventilation, seat belts, or the like. FIG. 20 depicts one embodiment where the slot 128 is a rear slot 128 located in the rear portion 74 of the lower seating surface 46. The rear slot 128 is depicted as having a generally rectangular shape but other shapes, sizes and locations may be used. The slot 128 may extend entirely through the lower seating surface 46 or only a portion thereof. The slot 128 may be formed by providing one of the mold parts 52, 54 to have a complementary shape to the desired shape of the slot 128. The mold part 52, 54 may move the trim layer 38, the carrier layer 42 and/or the foam layer 40 and/or the padding materials 44 away from the desired location of the slot. In addition, the mold parts 52, 54 may at the same time shape the layers 38, 40, 42 and/or the padding materials 44 so as to create a perimeter about the slot 128. FIG. 20 also depicts a similar slot 128a in the seat back 34, which may be located therein in a manner similar to that described above.

From FIGS. 19 and 20 it can be appreciated that high frequency forming may be used to shape all, or certain parts of the lower seating surface 46. For example, in one case, the trim layer 38, the carrier layer 42, the foam layer 40 and/or the padding materials 44 may be located into a high frequency forming machine having contours in the upper and/or lower mold parts 52, 54 complementary to a desired lower seating surface 46 shape. Thus, in the example in the figures, the machine may form the above mentioned seat layers 38, 40, 42 and/or padding material 44 to have a front rolled edge 130 that curves in a downwardly direction, the central area 60 behind the front rolled edge 130 where the central area 60 may be substantially planar or concave at least in part, upwardly extending bolsters 78 generally located along the central area 60 that may define the concave shape, and/or a rear bolster portion 132 that extends upwardly from the central area 60 that also may help define the concave shape. The rear bolster portion 132 may also function as a transition to the seat back 34.

Figure 21:
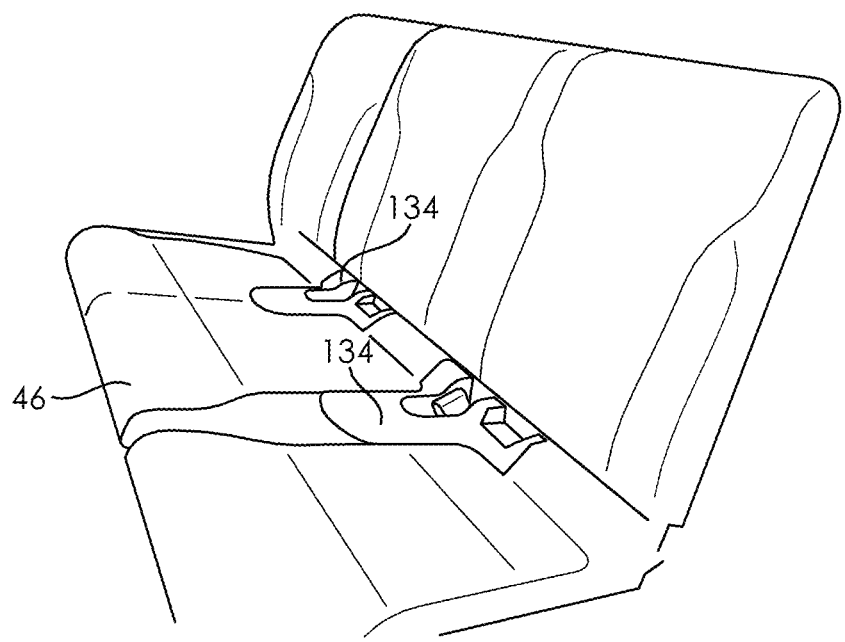
FIG. 21 is a schematic perspective view of a seat.

Turning now to FIG. 21, a further example of high frequency welded/formed components for a lower seating surface 46 is depicted. In this example, the high frequency welded/formed components may be such as one or more seat belt pockets 134. The pockets 134 may be formed with the lower seating surface 46, or separately formed via a high frequency forming process and then attached to the lower seating surface 46 by the process or by sewing or adhesives. In either case, each seat belt pockets 134 may be unitary, one piece and integrally formed through the high frequency forming process, which increases the appearance and craftsmanship of the part.

Using a high frequency forming process for these components is advantageous as it permits for shapes of the seat belt pockets 134 that would be difficult and time consuming to otherwise form. In addition, the seat belt pockets 134 can be formed as a single part whereas in the past they were formed of many individual components that were subsequently joined together. The individual parts are often further viewed as disadvantageous because their connections and seams are seen as a lack of quality.

Figure 22:
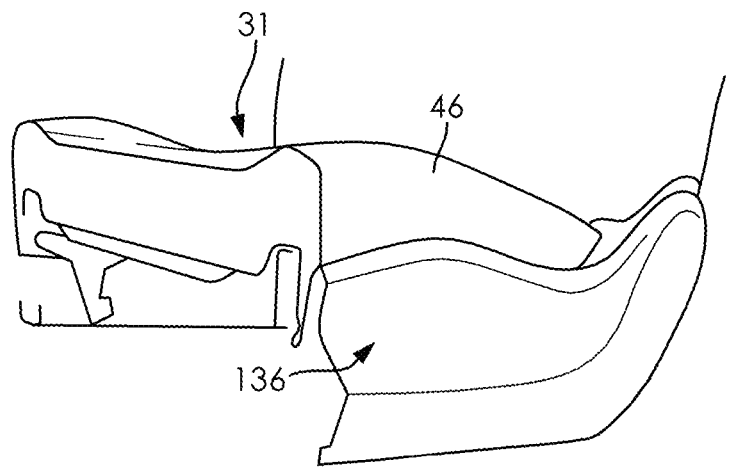
FIG. 22 is a schematic, perspective view of a side shield for a lower seating surface.

FIG. 22 depicts another embodiment where high frequency molding can be used to create and/or form a seat component. In this instance, high frequency molding is used to shape a side shield 136 for a seat 31. The side shield 136 may be molded as described above using the same or related process and or related equipment to shape the molding to the desired shape.

The side shield 136 may be formed of fabric and/or vinyl, both of which are lightweight materials. A side shield 136 constructed of these materials is lighter than the same part constructed of plastic by a traditional injected molding process. A lighter side shield makes for a lighter seat, which contributes to the light weighting of the vehicle which may improve fuel economy. The lightweight materials have a further advantage: they permit for materials to be more easily attached to them or for the side shield 136 to be attached to the lower seating surface 46. For example, the side shield 136 may be more easily sewn to the lower seating surface 46. An injection molded plastic part cannot be sewn because it is too thick and hard. By directly sewing the side shield 136 to the lower seating surface 46, extra attachment steps and products can be avoided, thus saving time and money during manufacturing and assembly. The side shield 136 may also be attached to the lower seating surface 46 via hook and loop fasteners, zippers or other structures as well.

Figure 23:
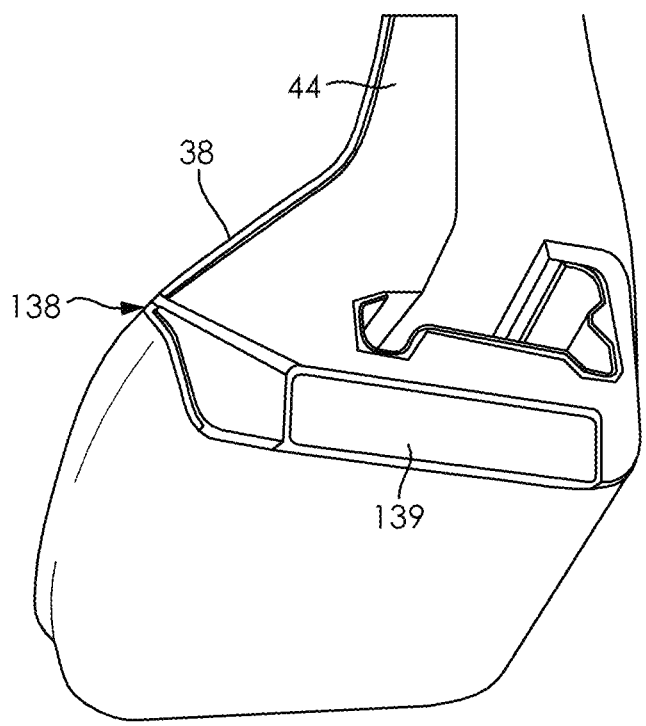
FIG. 23 is a schematic, cut away view of a seat.

FIG. 23 depicts another seat component that may be formed with high frequency molding. The seat component may be the trim layer 38 as disclosed above. As noted above as well, the thickness of the trim layer 38 may vary and this is one example of that variation.

A seam 138 may be located in the trim layer 38 through a high frequency molding step. In one embodiment, the trim layer 38 may be located adjacent one of the mold parts 52, 54 that has a ridge or rise. During the molding step, the ridge or rise may form the seam 138 in the trim layer 38 where the thickness of the trim layer 38 in the seam 138 may be thinner than the surrounding trim thickness. The trim layer 38 in the seam 138 may be substantially continuous or it may have apertures, such that the trim layer 38 in the seam 138 is perforated.

The trim layer 38 with the seam 138 may be used in locations where airbags 139 are located. The seam 138 provides a weakened area in the trim layer 38. The weakened area provides an area through which the airbag can expand through the trim layer 38 when it is triggered.

While a seam 138 is mentioned in the trim layer 38, it may also be located in the foam layer 40 and/or the carrier layer 42 of the cover 30. Further, while the figure depicts one area of the seat 31 where a seam 138 may be located, and only a single seam 138, the seam 138 may be located in other areas of the lower seating surface 46 and there may be more than one seam 138 therein. By creating a seat 31 in this fashion, the old and inefficient process of creating multiple pieces and then sewing them together to create the seam 138 is avoided.

Figure 24:
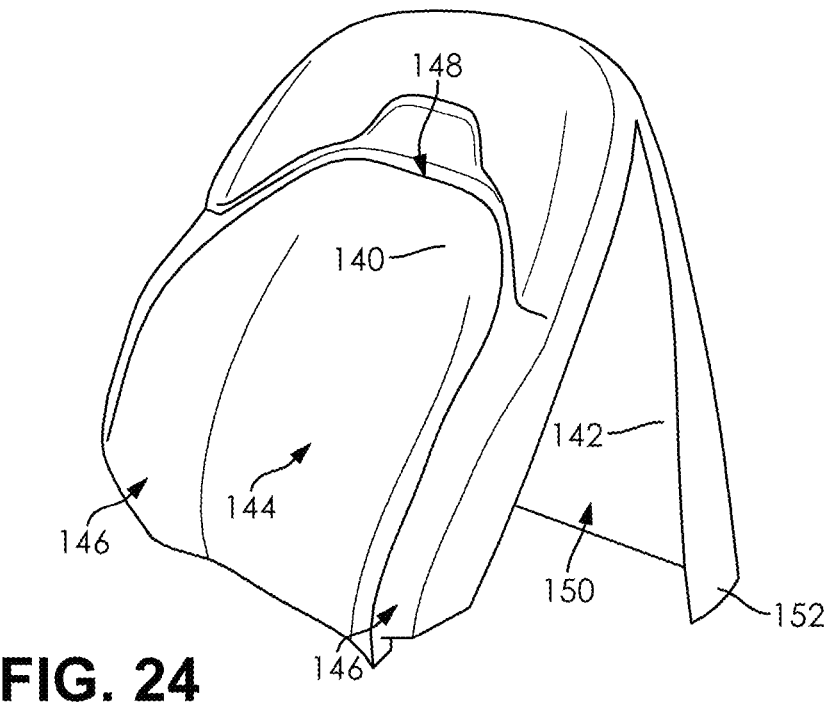
FIG. 24 is a schematic, perspective view of a seat cover.

FIG. 24 depicts another embodiment of a high frequency molded seat component. In this instance, the component may be such a front panel trim cover 140 and a rear panel trim cover 142. The front panel trim cover 140 may have a central portion 144 bounded by two side bolster portions 146. An upper portion 148 may extend between the two side bolster portions 146 and across the central portion 144.

The front panel trim cover 140 may be one piece, unitary and integrally formed. In one embodiment, the front panel trim cover 140 may be in a mold part 52 or 54 for a high frequency forming and joining unit 48 as described above. The mold part 52 or 54 may have a complementary shape to the desired shape of the front panel trim cover 140. The unit 48 may apply heat to form the front panel trim cover 140 to the shape depicted in FIG. 24. In such a case, the front panel trim cover 140 may be substantially ready to use and install on a vehicle seat without sewing, thus significantly reducing labor and parts.

The rear panel trim cover 140 may be formed, such as molded or high frequency welded, with or to the front panel trim cover 140. The rear panel trim cover 142 may have a central portion 150 bounded by two curved forward extending side portions 152. An upper portion 154 may extend between the two side bolster portions 146 and across the central portion 150.

The upper portion 154 of the rear panel trim cover 142 may be connected, such as hinged, to the front panel trim cover 140. The hinge permits the rear panel trim cover 142 to be selectively swung away from the front panel trim cover 140 so that the trim covers 140, 142 can be installed over a seat back 34 and/or seat cushion 32. The rear panel trim cover 142 and the front panel trim cover 140 can then be moved toward one another to enclose the seat back 34 and/or seat cushion 32. While one embodiment of the rear panel trim cover 142 attached to the front panel trim cover 140 is depicted, the two covers 140, 142 may be separately formed and then joined.

Figure 25:
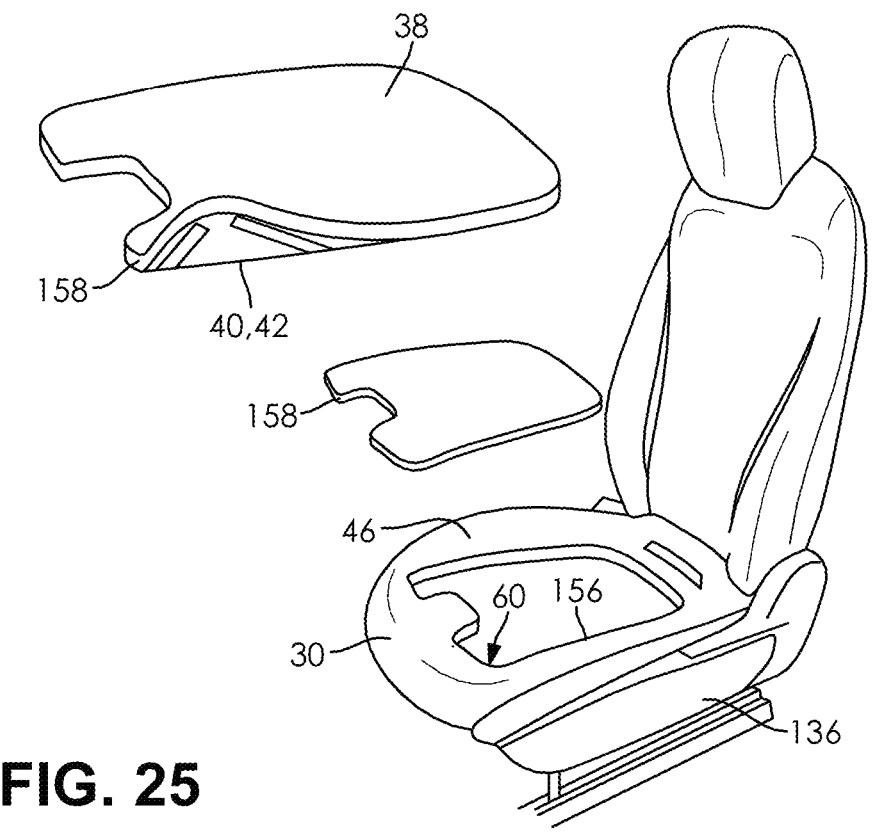
FIG. 25 is a schematic, perspective view of a seat and an insert.

FIG. 25 depicts one embodiment of a lower seating surface 46. The lower seating surface 46 may be covered with a molded seat cover 30. The molded seat cover 30 may be created by high frequency welding and/or molding as described above. In addition, the side shield 136 may be created by high frequency welding.

In the depicted embodiment, the central area 60 of the lower seating surface 46 may not be continuously covered by the molded seat cover 30. Instead, a gap 156 may exist in the central area 60 leaving the padding material 44 exposed. The gap 156 may selectively receive an insert 158 therein. The insert 158 may be such as a high frequency welded/formed seat cover insert. The insert 158 may be tuned for comfort and/or support via the use of selected materials, thickness of the materials and/or layering of materials. Various inserts 158 may be created via selection of the above-mentioned materials to various degrees so as to provide inserts 158 with different comfort levels. For example, one insert 158 may be provided with a trim layer 38 on a carrier layer 42 with little to no foam layer 40. Such an insert 158 may provide relatively firm support. As another example, another insert 158 may be provided with a trim layer 38, a thick foam layer 40 and a carrier layer 42 to provide more cushioned support. The size, shape and the location of the insert 158 may also be varied to provide different levels of support in different levels of the lower seating surface 46. Materials may also be selected with different weld/melt rates, as described above, which also results in inserts 158 with different comfort levels.

Figure 26:
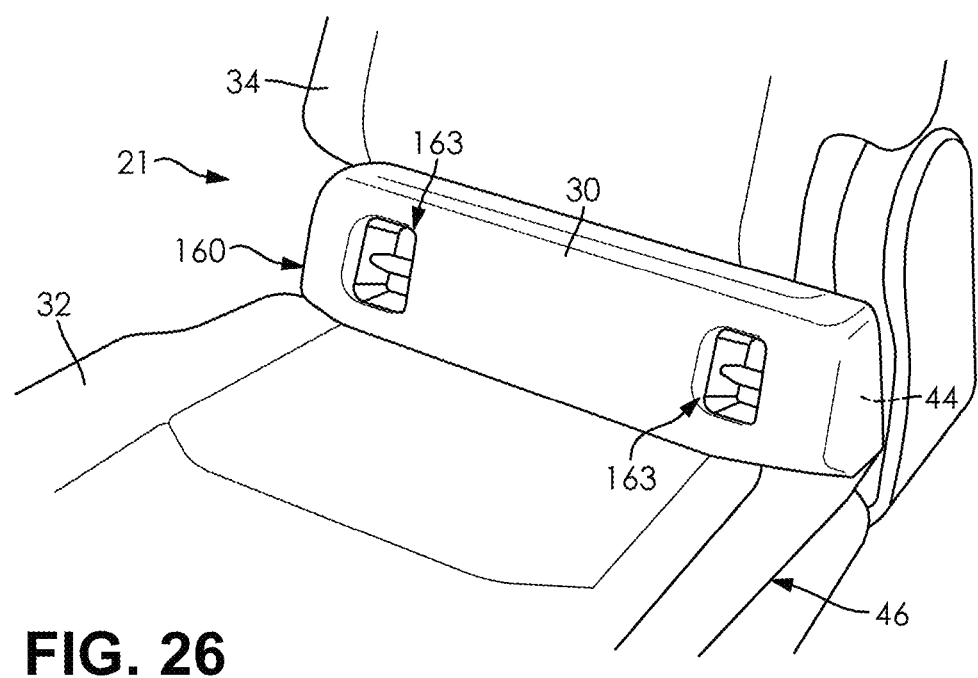
FIG. 26 is a schematic, perspective view of a portion of a seat.

FIG. 26 depicts another embodiment of a seat 21. This seat 31 might have an intermediate section 160 between the seat cushion 32 and the seat back 34. The intermediate section 160 may have one or more attachment portions 163, which may be such as seat belt attachment portions or car seat attachment portions, or it may be without these portions.

The intermediate section 160 may be provided with a cover, such as the seat cover 30 noted above. The seat cover 30 and/or the padding materials 44 may be the same or different than described above. For example, in one instance, the intermediate section 160 may be firmer than the adjacent lower seating surface 46.

In one case, all or portions of the intermediate section 160 may be firmer than the lower seating surface 46. The firmness/softness of a portion of a seat 31 may be quantified on a 0-7 softness scale, such as ISO Spec #17235. In this Spec, a low number is associated with a firm product and a high number is associated with a soft product. In some cases, the scale may refer to millimeters of deflection.

The intermediate section 160 may have a softness in the range of approximately. 0.5-2. In comparison, the lower seating surface 46 may have a range of approximately 1.5 to 4, and the side shield 136 and/or seat belt pockets 134 may have a range of approximately 0.2 to 1.5. In some cases, lower seating surfaces this product and process are designed to replace have a softness in the range of approximately 3-5. Thus, from the above, it can be appreciated that the new product and process results in a softness range of the previous devices, but with many fewer manufacturing steps, many fewer parts and much less time compared with a seat constructed of a traditional process for cutting out the various components and then sewing them together.

In some cases, a seat portion with a softer construction may be adapted advantageous for seat 31 comfort or stretch characteristics. For example, it may be desirable to have a lower seating surface 46 constructed of a relatively soft material so that the material may stretch in the directions of the front and back of the seat 31 as well as laterally to the sides of the seat 31. In other cases, a firmer construction may be preferred for appearance or robustness. For example, it may be preferred to have the intermediate section 160 constructed of a harder material to withstand mechanical connections and functions (such as with seat belts or car seats)

The firmness/softness of the various seat portions can be created using the methods and materials disclosed above so as to tune the seat to a particular user or particular application.

In accordance with the provisions of the patent statutes, the present device and method has been described in what is considered to represent its preferred embodiments. However, it should be noted that the device and method can be practiced otherwise than as specifically illustrated and described without departing from its spirit or scope.

What is claimed is:

1. A method of forming a seat cover, comprising:
providing a high frequency welding device;
locating a seat cover in the high frequency welding device;
energizing the high frequency welding device to either join two or more pieces of the seat cover together or to impart a shape to the seat cover; and
attaching a trim tie down to the seat cover;
wherein at least one mold part of the high frequency welding device closes at least partially about the seat cover so that heat from the mold part and the shape of the mold part transfers to the seat cover;
wherein the at least one mold part imparts at least one concave shape to the seat cover.

2. The method of claim 1, wherein the at least one mold part imparts at least one of a pattern, a contour, a projection, a texture, a groove, a trench, or a convex shape to the seat cover.

3. The method of claim 1, wherein the two or more pieces of the seat cover that are joined together are a trim layer, a foam layer or a carrier layer of the seat cover.

4. The method of claim 1, wherein the two or more pieces of the seat cover that are joined together are two pieces of a trim layer that are laterally adjacent one another at an intersection.

5. The method of claim 1, wherein the seat cover is joined to a cushion and the seat cover and the cushion are located in the high frequency welding device and the seat cover and the cushion are simultaneously shaped and joined.

6. The method of claim 1, wherein when the high frequency welding device joins two or more pieces of the seat cover together the pieces have different melt rates.

7. The method of claim 1, wherein when the high frequency welding device joins two or more pieces of the seat cover together the pieces have different thicknesses.

8. The method of claim 1, wherein a body portion of the trim tie down extends through a foam layer and/or a carrier layer of the seat cover.

9. The method of claim 1, wherein the trim tie down comprises at least one of (a) beaded duon; (b) a hook fastener; and/or (c) a loop fastener.

10. The method of claim 1, wherein the trim tie down comprises a surface contacting a lower surface of the seat cover.

11. The method of claim 1, wherein the seat cover comprises a carrier layer; wherein the trim tie down comprises (a) a tab extending along at least a portion of the carrier layer and (b) a body portion extending from the tab.

12. The method of claim 1, wherein the trim tie down is attached to the seat cover with high frequency molding.

13. The method of claim 1, wherein the concave shape is formed in a bolster along a central area of a lower seat surface.

14. The method of claim 1, wherein the concave shape is formed in a central area of a lower seat surface; wherein upwardly extending bolsters are located along the central area.

15. The method of claim 1, wherein the two or more pieces of the seat cover comprise a trim layer and a foam layer extending substantially over a carrier layer.

16. The method of claim 15, wherein the carrier layer comprises at least one of (a) a woven material; (b) a non-woven material; (c) a press felt; (d) a carpet; (e) a knitted fabric.

17. The method of claim 1, further comprising the steps of (a) forming a recess in a trim layer, a foam layer and/or a carrier layer of the seat cover by high frequency forming and (b) securing a badge in the recess.

18. A seat cover prepared by the process of claim 1.

19. A seat cover formed by a process, comprising:
providing a high frequency welding device;
locating a seat cover in the high frequency welding device;
energizing the high frequency welding device to either join two or more pieces of the seat cover together or to impart a shape to the seat cover;
wherein at least one mold part of the high frequency welding device closes at least partially about the seat cover so that heat from the mold part and the shape of the mold part transfers to the seat cover;
wherein the at least one mold part imparts at least one concave shape to the seat cover,
wherein the concave shape is formed in a bolster along a central area of a lower seat surface.

20. A seat cover formed by a process, comprising:
providing a high frequency welding device;
locating a seat cover in the high frequency welding device;
energizing the high frequency welding device to either join two or more pieces of the seat cover together or to impart a shape to the seat cover;
wherein at least one mold part of the high frequency welding device closes at least partially about the seat cover so that heat from the mold part and the shape of the mold part transfers to the seat cover;
wherein the at least one mold part imparts at least one concave shape to the seat cover,
wherein the concave shape is formed in a central area of a lower seat surface; wherein upwardly extending bolsters are located along the central area.

* * * * *